United States Patent
Atkinson

(10) Patent No.: US 10,754,402 B2
(45) Date of Patent: Aug. 25, 2020

(54) DATA TRANSFER VIA A DATA AND POWER CONNECTION

(71) Applicant: HEWLETT-PACKARD DEVELOPMENT COMPANY, L.P., Houston, TX (US)

(72) Inventor: Lee Atkinson, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 88 days.

(21) Appl. No.: 16/067,708

(22) PCT Filed: Mar. 25, 2016

(86) PCT No.: PCT/US2016/024259
§ 371 (c)(1),
(2) Date: Jul. 2, 2018

(87) PCT Pub. No.: WO2017/164890
PCT Pub. Date: Sep. 28, 2017

(65) Prior Publication Data
US 2019/0025897 A1   Jan. 24, 2019

(51) Int. Cl.
*G06F 1/26*   (2006.01)
*G06F 13/38*   (2006.01)
*G06F 11/30*   (2006.01)
*G06F 11/14*   (2006.01)
*G06F 13/42*   (2006.01)

(52) U.S. Cl.
CPC .......... *G06F 1/266* (2013.01); *G06F 11/1423* (2013.01); *G06F 11/3027* (2013.01); *G06F 13/38* (2013.01); *G06F 13/4282* (2013.01); *G06F 2213/0042* (2013.01)

(58) Field of Classification Search
CPC ... G06F 1/266; G06F 1/28; G06F 1/30; G06F 1/32; G06F 1/3206; G06F 1/3234; G06F 1/324; G06F 1/3243; G06F 1/3253; G06F 1/3296; G06F 11/3027; G06F 11/3058; G06F 13/38; G06F 13/4282; G06F 11/142; G06F 11/1423
See application file for complete search history.

(56) References Cited

U.S. PATENT DOCUMENTS

| | | |
|---|---|---|
| 7,397,776 B2 | 7/2008 | Maufer et al. |
| 7,657,788 B2 | 2/2010 | Choi |
| 8,423,809 B2 | 4/2013 | Ushigami |
| 8,670,335 B2 | 3/2014 | Barkan et al. |
| 8,774,257 B2 | 7/2014 | Yen et al. |

(Continued)

FOREIGN PATENT DOCUMENTS

| | | | |
|---|---|---|---|
| KR | 20140048473 A | * | 4/2014 |
| WO | WO2015/089803 A1 | | 6/2015 |

OTHER PUBLICATIONS

Tripathi, J.N. et al, "Robust Optimization of Serial Link System for Signal Integrity and Power Integrity", Nov. 2-26, 2010.

*Primary Examiner* — Thomas J. Cleary
(74) *Attorney, Agent, or Firm* — Fabian VanCott

(57) ABSTRACT

A method of data transfer via a data and power connection includes determining whether a data transmission error is detected via the data and power connection. The method further includes, in response to a determination that a data transmission error is detected via the data and power connection, decreasing current across the data and power connection.

20 Claims, 6 Drawing Sheets

(56) References Cited

U.S. PATENT DOCUMENTS

| | | | | |
|---|---|---|---|---|
| 9,728,983 B2* | 8/2017 | Lun Li | ...................... | H02J 7/00 |
| 2006/0236141 A1* | 10/2006 | Chang | ...................... | G06F 1/26 |
| | | | | 713/300 |
| 2007/0236169 A1* | 10/2007 | Purdy | ...................... | H02J 7/00 |
| | | | | 320/106 |
| 2008/0034106 A1 | 2/2008 | Bakshi et al. | | |
| 2011/0221604 A1* | 9/2011 | Johnson | ................ | H02J 7/0071 |
| | | | | 340/664 |
| 2014/0208134 A1* | 7/2014 | Waters | ................. | G06F 13/385 |
| | | | | 713/310 |
| 2015/0301552 A1* | 10/2015 | Lim | ........................ | G01K 7/16 |
| | | | | 327/538 |
| 2015/0304306 A1 | 10/2015 | Ponsford et al. | | |
| 2015/0362984 A1 | 12/2015 | Waters et al. | | |
| 2016/0117274 A1* | 4/2016 | Waters | ................. | G06F 13/362 |
| | | | | 710/106 |
| 2016/0268731 A1* | 9/2016 | Ziegenfuss | ........... | H01M 10/46 |
| 2016/0349292 A1* | 12/2016 | Atkinson | .................. | G06F 1/28 |
| 2017/0229892 A1* | 8/2017 | Kobayashi | ............. | H01R 24/60 |
| 2018/0006471 A1* | 1/2018 | Hayes | ................... | H02J 7/0013 |

\* cited by examiner

DATA TRANSFER VIA A DATA AND POWER CONNECTION

BACKGROUND

On a physical layer of a computing device, a number of computer ports may be provided. Computer ports are specialized outlets on a computing device to which a plug or cable connects. Electronically, the several conductors where the port and cable contacts of the cable connect, provide a method to transfer signals between devices. Further, power may be transferred via the cable as well. Cables that pass electrical power along with data may be referred to herein as power over data line (PoDL) cabling.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
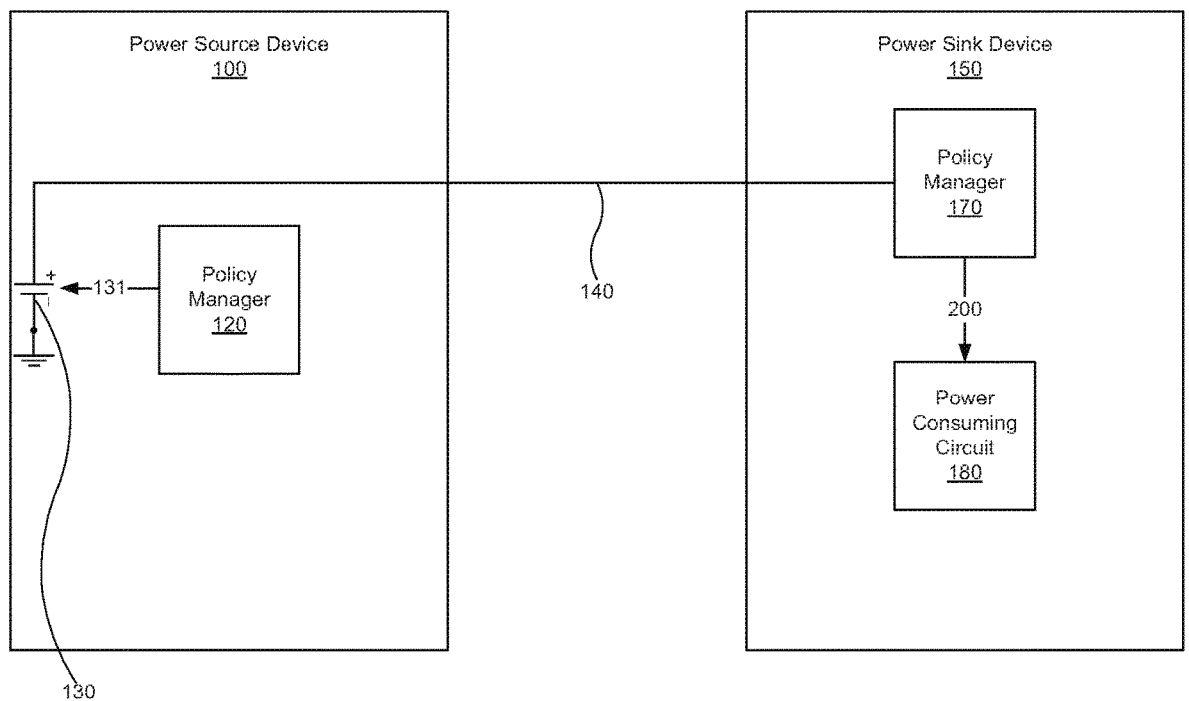
FIG. 1 is a block diagram of a system for transferring data via a combination data and power connection, according to one example of the principles described herein.

One type of PoDL includes a universal serial bus (USB) power delivery interface. USB Power Delivery (USB-PD), in the context of the examples described herein, is a standard for bidirectional communication and power transfer over a USB interface. USB-PD uses digital communication between a first computing device acting as a power source and a second computing device acting as a power sink. Such examples of a USB power delivery (USB-PD) interface may include, for example, a USB Type-C interface.

Thus, USB interfaces have evolved from a data interface capable of supplying limited power to a primary provider of power with a data interface. Many computing devices charge or get their power from USB ports contained in laptops, cars, aircraft, and wall sockets. Further, USB interfaces have become a ubiquitous power socket for many small devices such as mobile phones, MP3 players, and other hand-held devices. USB interfaces handle not only data, but also provide power to, or charge, a wide array of computing devices simply, and often without loading a driver, in order to carry out USB functions.

Chapter 5.8 of the *Universal Serial Bus Power Delivery Specification*, Revision 2.0, Version 1.1 issued by the USB Implementers Forum, Inc., which is hereby incorporated by reference in its entirety, describes physical layer signaling schemes and signaling methods. This USB-PD specification describes usages for the USB-PD communication interface, and describes the scope of the usage for this type of digital communication as being unlimited. Communication provides for initial identification and configuration of computing devices attached over the USB-PD interface, and also provides for runtime communication of events occurring at either end of the USB Type-C cable. Communication over a USB Type-C interface may occur between the computing device acting as a power supply and the computing device acting as a power sink. However, types of devices communicating over the USB-PD interface are unlimited and may include peripheral devices such as docking stations, displays, and printers, as well as computer-to-computer connections.

Communication using the USB Type-C interface is a point-to-point communication in which the network includes a dedicated link between two endpoints. The physical layer (PHY) and the signaling method, introduced at, for example, 2.6.2.2 of the *Universal Serial Bus Power Delivery Specification*, Revision 2.0, Version 1.1, and described in chapter 5 of the same document and used for USB Type-C is called bi-phase mark coding (BMC). The configuration channel (CC) line carrying the CC signal is a bidirectional signal for communication between the sink computing device and the source computing device.

The communication stack between the sink computing device and the source computing device may each include a device policy manager to manage USB-PD resources within the device across a number of ports based in the device's local policy. A policy engine may also be included in association with each USB-PD port to implement the local policy for the respective ports. The communication stack may also include a protocol layer that enables data in the form of, for example, messages to be exchanged bi-directionally between the sink computing device and the source computing device. Further, the sink computing device and the source computing device may each include a physical layer (PHY) that executes transmission and reception of bits on the wire and executes data transmissions.

The physical connection of a USB-PD such as a USB Type-C includes USB data and power transfer lines. With this physical configuration, the digital communication utilized by the BMC signaling method of the USB Type-C interface may be adversely affected by noise or random fluctuations in the electrical signals transmitted by the data and power transfer lines. Noise may be especially detrimental when the length of the data and power transfer lines is long such as between, for example, 2 and 4 meters.

In one example, two aspects related to power transfer from the source computing device to the sink computing device are understood to have an impact on the ability for the source and sink to communicate over the CC line. First, ground shift between the source computing device and the sink computing device creates resistance within the cable connecting the two devices. This, in turn, creates a voltage differential between the ground of the source computing device and the ground of the sink computing device. For example, USB-PD BMC receiver specifications indicates the cable drop and differential to be less than 250 mV. However, when the resistance of the cable is higher than expected, or the power consumption of the sink computing device causes high current on the cable, the voltage drop increases and exposes the communication over the CC line to errors in communication.

Second, transient current on the voltage bus ($V_{bus}$) or ground will cause a magnetic field in the cable which affects the CC signal. USB-PD specifications allow for a modest transition of 150 milliamps per microsecond. Power transfer between the source computing device and the sink computing device has, in some instances, exceeded 1 amp per microsecond. This faster load transient affects the CC line, and exposes communication over the CC line to errors in communication.

USB-PD recognizes errors in communication. A successful message results in an acknowledgement (ACK) signal from, for example, the sink computing device acting as a receiver to the source computing device acting as a transmitter. An error in communication from a message initiated by a transmitter may be detected by an invalid checksum by the physical layer (PHY) in the receiver. A policy manager of, for example, the receiver, may respond with a not acknowledged (NACK) signal, and the policy manager of the transmitter may retry the message.

Since a power consumption circuit within the sink computing device operates fully independently of the communication between the source computing device and the sink computing device, the power consumption circuit may operate continuously in a mode that causes the communication from the source computing device to the sink computing device to fail. After a number of retries, the source computing device may give up on communication, and may cause a reset of the USB-PD operation.

Thus, examples described herein provide a method of data transfer via a data and power connection. The method includes determining whether a data transmission error is detected via the data and power connection, and in response to a determination that a data transmission error is detected via the data and power connection, decreasing current across the data and power connection. In one example, decreasing current across the data and power connection includes, with a policy manager of a power sink device, decreasing power consumption of a power consuming circuit of the power sink device. In another example, decreasing current across the data and power connection includes, with a policy manager of the power source device, increasing a voltage output of a power source device to decrease a current on at least one power supply line.

In one example, the power consuming circuit is a battery. In this example, the policy manager decreases the charge rate of the battery if the data transmission error is detected via the USB connection. In another example, the power consuming circuit is a processing device. In this example, the policy manager decreases a frequency of the processing device if the data transmission error is detected via the USB connection.

The method includes determining whether power consumption by a power sink device will affect the data transfer via the data and power connection before initiating a data transfer or before initiating a retry of the data transfer. In response to a determination that power consumption by the power sink device will affect the data transfer, the method includes increasing a voltage output of a power source device to decrease a current on at least one power supply line.

Decreasing power consumption of the power consuming circuit of the power sink device includes decreasing power consumption in a number of increments progressively based on a number of retries of the data transfer, a measure of severity of the data transmission error, or combinations thereof. Further, restoring power consumption of the power consuming circuit of the power sink device may include restoring power consumption in a number of increments based on a number of successful data transfers.

Examples described herein provide a system for transferring data via a combination data and power connection. The system includes a policy manager of a power sink device to determine whether a data transmission error is detected via the combination data and power connection, and, in response to a determination that a data transmission error is detected, decrease power consumption of a power consuming circuit of the power sink device. The system further includes a policy manager of a power source device. The policy manager of the power source device determines whether a data transmission error is detected via the combination data and power connection, and, in response to a determination that a data transmission error is detected, increases a voltage output of the power source device to decrease a current on at least one power supply line.

In one example, the data transmission error is detected by a lack of receipt of an acknowledgement (ACK) packet from the power source device. In another example, the data transmission error is detected by error detection performed by the power source device. The combination data and power connection is a universal serial bus power delivery (USB-PD) connection that provides power transfer and bidirectional communication over a USB interface of the USB-PD connection.

Examples described herein provide a system for transferring data via a combination data and power connection. The system includes a policy manager of a power source device to determine whether a data transmission error is detected via the combination data and power connection, and, in response to a determination that a data transmission error is detected, increase a voltage output of the power source device to decrease a current on at least one power supply line. The system includes a policy manager of a power sink device communicatively coupled to the policy manager of a power source device. The policy manager of the power sink device determines whether a data transmission error is detected via the combination data and power connection. In response to a determination that a data transmission error is detected, the policy manager of the power sink device decreases power consumption of a power consuming circuit of the power sink device. The policy manager of the power source device increases the voltage output of the power source device in a number of increments progressively based on a number of retries of the data transfer, a measure of severity of the data transmission error, or combinations thereof. The policy manager of the power sink device restores the voltage output by the power source device in a number of increments based on a number of successful data transfers.

As used in the present specification and in the appended claims, the term "power sink" or similar language is meant to be understood broadly as any computing device receiving power from a power source. A power sink may also be referred to as a power consumer or as an upstream facing port (UFP) computing device. The power sink is any computing device that includes at least one power consuming circuit.

As used in the present specification and in the appended claims, the term "power source" or similar language is meant to be understood broadly as any computing device providing power to another computing device. A power source may also be referred to as a power provider or a downstream facing port (DFP) computing device. The power source is any computing device that includes at least one power providing circuit.

Even still further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a system for transferring data via a combination data and power connection (140), according to one example of the principles described herein. The system includes a power source device (100) and a power sink device (150). The power source device (100) may be any computing device providing power to the power sink device (150), and the power sink device (150) may be any computing device receiving power from the power source device (100). In one example, the power source device (100) may be an alternating current (AC) adaptor, a laptop computing device, a desktop computing device, a mobile telecommunications device, a server, a personal digital assistants (PDAs), a smartphone, a gaming system, a tablet computing device, other electronic devices, or combinations thereof.

In one example, the power sink device (150) may be a computing device, a peripheral device, a laptop computing device, a desktop computing device, a mobile telecommunications device, a server, a personal digital assistants (PDAs), a smartphone, a gaming system, a tablet computing device, other electronic devices, or combinations thereof. In still another example, the power source device (100) and power sink device (150) may be any computing devices capable of sending and receiving data and power via a USB-PD connection or interface. In still another example, the power source device (100) and power sink device (150) may be any computing devices capable of sending and receiving data and power via a USB Type-C connection or interface.

The systems and devices described herein are used to detect when communication via a PoDL cabling (140) such as USB-PD cable is affected, and decreases current across the PoDL cabling (140) in order to enable successful communication and reduce or eliminate any noise or other random fluctuations in an electrical signal as is characteristic of all electronic circuits. Failure of communication may be identified by, for example, the lack of an acknowledgement (ACK) message from the receiver, by direct error detection methods, or combinations thereof. Mitigation or alteration of the power transmitted via the PoDL cabling (140) is performed by, the power sink device (150) lowering power consumption of a power consuming circuit, by the power source device (100) increasing its voltage output to the power sink device (150) to effectively decrease the current on a power supply line, or combinations thereof.

The power source device (100) includes a first policy manager (120) that is capable of determining whether a data transmission error is detected via the combination data and power connection (140). The combination data and power connection (140) may be referred to as the power over data line (PoDL) cabling (140). The PoDL cabling (140) may be a universal serial bus (USB) cable of coupling a USB port of the power source device (100) to a USB port of the power sink device (150). Thus, throughout the examples described herein, the PoDL cabling (140) is a USB-PD cable. In this example, the USB cabling may be, for example, a USB Type-C cable. However, examples described herein may employ any communication protocol. The policy managers (120, 170) of the power source device (100) and the power sink device (150), respectively, may each be, for example, a microcontroller of their respective devices (100, 150).

The policy managers (120, 170) of the power source device (100) and the power sink device (150), respectively, decrease current across the PoDL cabling (140) in response to a determination that a data transmission error is detected via the data and power connection. The policy managers (120, 170) manage power delivery resources within the power source device (100) and power sink device (150), respectively, across at least one set of ports based on these respective devices' policies. The policy managers (120, 170) include a number of policy engines or other devices that execute a number of policies and rules regarding management of the power delivery resources.

A first policy manager (120) of the power source device (100) is capable of, in response to a determination that a data transmission error is detected, decreasing current across the data and power connection by increasing a voltage output of a power source (130) to decrease a current on at least one power supply line of the PoDL cabling (140). In one example, the power source (130) may be an alternating current source, a direct current source, a battery, other power source devices, or combinations thereof. In another example, the power source (130) is an alternating current/direct current (AC/DC) converter or a battery. More details regarding the power source device (100) will be provided below.

A second policy manager (170) of the power sink device (150) is capable of, in response to a determination that a data transmission error is detected, decreasing current across the data and power connection by decreasing power consumption of a power consuming circuit (180) of the power sink device (150). The policy manager (170) communicates with the power consuming circuit (180) via control line (200) to instruct the power consuming circuit (180) to reduce consumption of power through a reduction in operations, stopping operations for a period of time, or combinations thereof. In one example, the power consuming circuit (180) may be a processing device, a battery, a display device, a data storage device, a peripheral device coupled to the power sink device (150), other power consuming devices, or combinations thereof. The power consuming circuit (180) includes both static and dynamic power consumption properties. For example, static power consumption may include charge current to a battery cell acting as the power consuming circuit (180), or an LED current drive in an LCD display acting as the power consuming circuit (180). An example of dynamic power consumption may include a processor circuit or a processor acting as the power consuming circuit (180) alternating between power management modes, resulting in temporal peaks and valleys of current consumption by the power sink device (150). More details regarding the power sink device (150) will be provided below.

Communication and decisions between the power sink device (150) and the power source device (100) are performed by their respective policy managers (120, 170) connected to a common signal transmitted over a configuration channel (CC) line (FIG. 2, 142) of the PoDL cabling (140). Either policy manager (120, 170) may initiate and receive data via the CC line (FIG. 2, 142) of the PoDL cabling (140). The CC line (FIG. 2, 142) carries a bidirectional configuration channel signal for communication between the power sink device (150) and the power source device (100). Any type of signal may be carried via the PoDL cabling (140) including, for example, USB data signals, display port signals, signals transmitted by a THUNDERBOLT® hardware interface, other forms of signals, signaling hardware, and signaling protocols, or combinations thereof may also be carried by the PoDL cabling (140).

Figure 2:
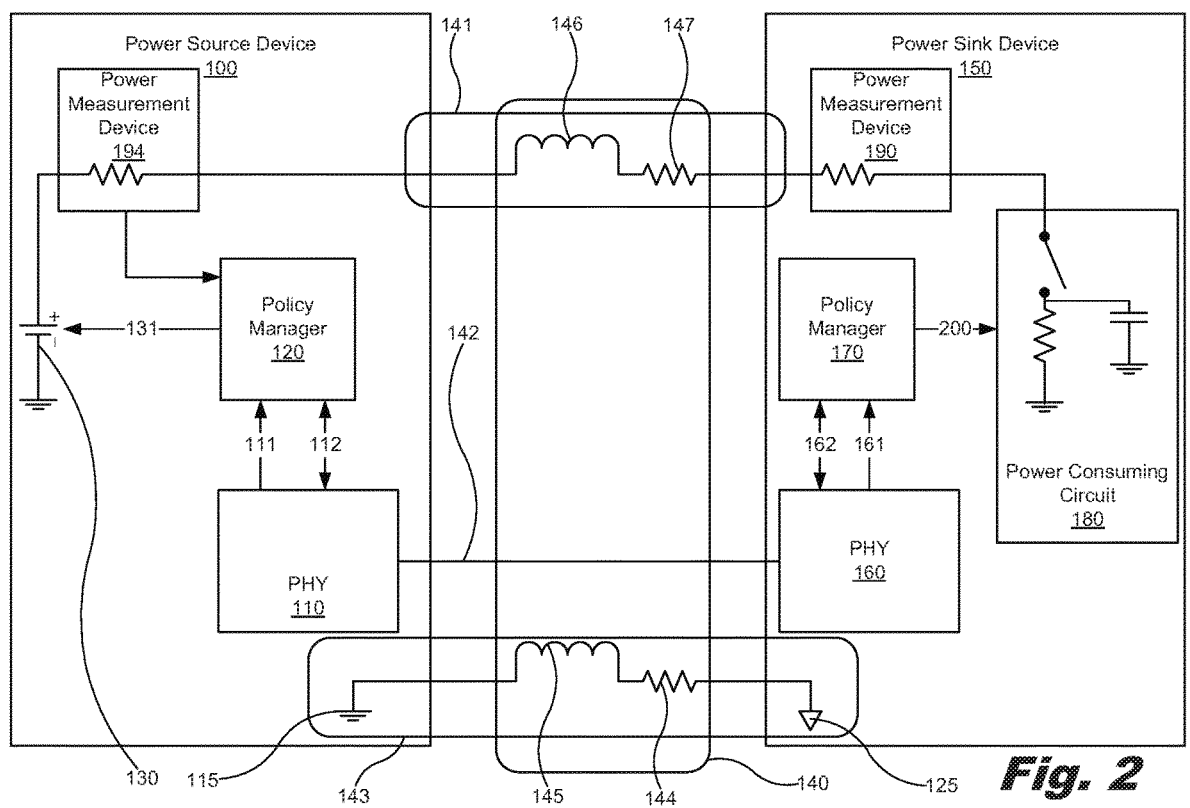
FIG. 2 is a block diagram of a system for transferring data via a combination data and power connection, according to another example of the principles described herein.

FIG. 2 is a block diagram of a system for transferring data via a PoDL cabling (140), according to another example of the principles described herein. The description above in connection with FIG. 1 applies for identically referenced elements in FIG. 2. FIG. 2 includes additional elements that will now be described. The PoDL cabling (140) includes at least a voltage bus ($V_{bus}$) line (141), a configuration channel (CC) line (142), and a ground line (143) between the power source device (100) and the power sink device (150). The PoDL cabling (140) includes some impedance in the form of resistance and inductance. Thus, the $V_{bus}$ line (141) and the ground line (143) may include inductive properties as indicated by elements 145 and 146, a number of resistive properties as indicated by elements 144, 147, other electrical properties, or combinations thereof. In one example, the resistance (144) of the ground line (143) may be approximately between 50 and 80 milliohms. Loop inductance of the PoDL cabling (140) may be approximately 900 microhenries with the inductance (145) of the ground line (143) being approximately 2 henries in a single-ended measurement.

The $V_{bus}$ line (141) may be coupled to the power source (130) via the power measurement device (194) of the power source device (100). The $V_{bus}$ line (141) may be coupled to the power consuming circuit (180) via the power measurement device (190) of the power sink device (150). In this manner, voltage may be provided from the power source device (100) to the power sink device (150). Approximately between 3 and 5 Amps of current may be transmitted over the $V_{bus}$ line (141). The policy manager (120) of the power source device (100) is coupled to and effects the voltage output of the power source (130) via control line (131). Similarly, the policy manager (170) of the power sink device (150) is coupled to and effects the power consumption of the power consuming circuit (180) via control line (200). In this manner, the policy managers (120, 170) of the power source device (100) and the power sink device (150) are able to control the amount of current that moves across the $V_{bus}$ line (141).

The power sink device (150) and the power source device (100) each include a physical layer (110, 160) that receive the electrical signal on the CC line (142) and convert the electrical signal to data that is able to be read by each policy manager (120, 170). The PHYs (110, 160) may each be, for example, modems of their respective devices (100, 150). The physical layers (110, 160) may also output an error signal to the policy managers (120, 170) indicating when there has been some corruption on the CC line (142) that results in a failure of communication between the power source device (100) and the power sink device (150).

The power sink device (150) and the power source device (100) each include a power measurement device (190, 194). For example, the power measurement device (190) of the power sink device (150) may measure or estimate the power consumption of the power sink device (150) and its power consuming circuit (180). The power measurement device (190) may directly measure the power consumption from the $V_{bus}$ line (141). In another example, the power measurement device (190) of the power sink device (150) may estimate power consumption using a number of additional or alternative methods. For example, where the power consuming circuit (180) is a processing device, the power measurement device (190) may measure a level of processor utilization and estimate power consumption based on the utilization level of the processor. In another example where the power consuming circuit (180) is a battery, the power measurement device (190) may measure a charge rate of the battery, and estimate power consumption based on the charge rate.

The power measurement device (194) of the power source device (100) may measure or estimate the power output of the power source (130) of the power source device (100). For example, the power measurement device (194) may directly measure the power output from the $V_{bus}$ line (141). In another example, the power measurement device (194) of the power source device (100) may estimate power consumption using a number of additional or alternative methods. For example, where the power source (130) is an AC/DC converter, the power measurement device (194) may directly measure the amount of energy transmitted by the power source (130). In an example where the power source (130) is a battery, the power measurement device (194) may measure the capacity of the battery.

In one example, the voltage output of the power source (130) may be varied under the control of policy manager (120) of the power source device (100). For example, in some instances, the power sink device (150) may negotiate a specific voltage from the power source device (100) and the power source (130). As mentioned above, the digital communication utilized by the BMC signaling method of the USB Type-C interface, for example, may be adversely affected by noise or random fluctuations in the electrical signals transmitted by the data and power transfer lines. Noise may be especially detrimental when the length of the data and power transfer lines is long such as between, for example, 2 and 4 meters. This noise may occur when a voltage drop between a first ground (115) of the power source device (100) and a second ground (125) of a power sink device (150) occurs. When viewing current that moves from the power sink device (150) to the power source device (100), a voltage offset is created on the ground line (143) when the current passes through the resistor (144). In this situation, the voltage difference between the first ground (115) and the second ground (125) will begin to deviate, and the PHY (110) of the power source device (100) is viewing a different ground voltage than the PHY (160) of the power sink device (150). Thus, when the ground reference changes between the power source device (100) and the power sink device (150), the communication on the CC line (142) becomes shifted, and the power source device (100) and the power sink device (150) are not talking at the same voltage. A permissible voltage differential between the first ground (115) and the second ground (125) may be approximately a 250 millivolt differential as defined by, for example, Table 5-26 found in the *Universal Serial Bus Power Delivery Specification*, Revision 2.0, Version 1.1. Exceeding this allowed differential is extremely easy in a system presented in FIG. 2.

Further, in a situation where the power consuming circuit (180) is a processor or other device that fluctuates with respect to power consumption using high- and low-power modes as the processor moves between being inactive and being fully powered, current becomes very dynamic. In one example, the processor may move from 0 Watts to 50 Watts in approximately two to four microseconds, which is a fast transient. Specifically, the current through the ground line (143) peaks, a load step occurs and a sudden change in the amount of current that flows through the ground line (143) and the $V_{bus}$ line (141) is experienced. This, in turn, causes a large surge in current on the PoDL cabling (140).

When a large surge in current occurs on the PoDL cabling (140), a magnetic field is created in the PoDL cabling (140). The CC line (142) is negatively influenced by this magnetic field, and data transmitted over the CC line (142) will be effected. In this situation, every bit of data may not be transmitted over the CC line (142).

During data transmission from, for example, the power source device (100) to the power sink device (150), the policy manager (120) of the power source device (100) may initiate a message to be sent to the power sink device (150) by instructing its PHY (110) to send data defining the message to the PHY (160) of the power sink device (150). FIG. 2 depicts data transmissions (112, 162) to and from the power source device (100) and power sink device (150) via their respective policy managers (120, 170) and PHYs (110, 160). Further, error detection is indicated by arrows 111 and 161 in which the policy managers (120, 170) are informed of or detect errors in the data transmission.

In one example of error detection, the policy manager (170) of the power sink device (150) may send an acknowledgement message to the policy manager (120) of the power source device (100) indicating that the data was transmitted correctly, if that is, in fact, the case. However, in some instances in which the communication between the power source device (100) and the power sink device (150) is effected by noise and/or voltage differentials as described above, the data transmission may not be completed. In these instances, the policy manager (170) sends a not acknowledged (NACK) message or signal to the policy manager (120) of the power source device (100). Further, in some cases, the policy manager (120) may simply time out after a period of time has passed without an ACK message from the policy manager (170) indicating that at least a portion of the message was not received.

In situations where a message fails, the policy managers (120, 170) may take a number of actions to assure correct transmission of the data during a retry of the message transmission. Specifically, in response to a determination that a data transmission error is detected via the PoDL cabling (140), the power source device (100), the power sink device (150), or both take steps to decrease an amount of current across the PoDL cabling (140). A decease in the amount of current across the PoDL cabling (140) will result in the reduction or elimination of failed data transmission instances.

Figure 5:
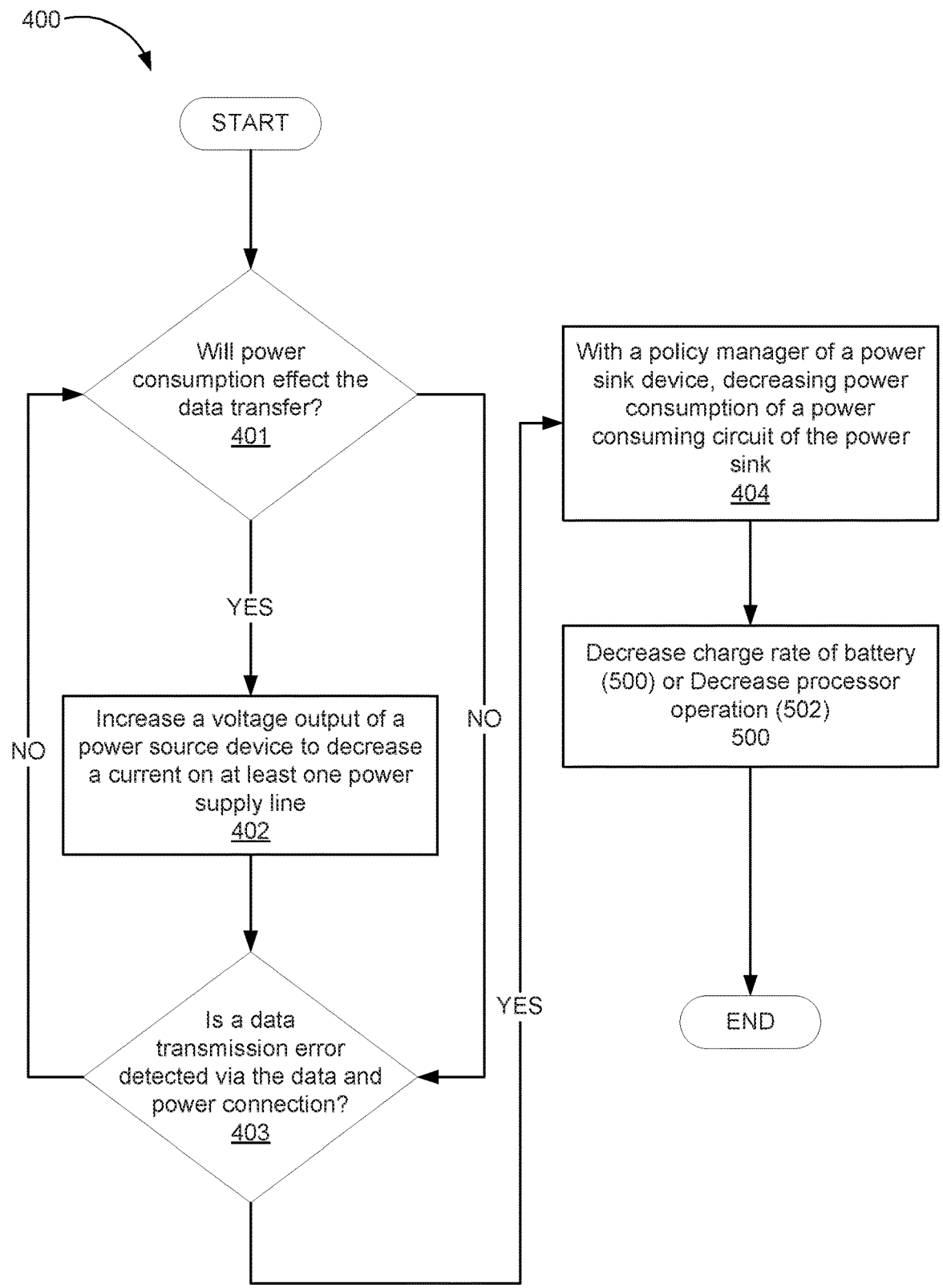
FIGS. 5 and 6 are a similar flowcharts to FIGS. 3 and 4, according to alternative examples.

One way the power source device (100), the power sink device (150), or both take steps to decrease an amount of current across the PoDL cabling (140) is by decreasing power consumption of the power consuming circuit (180) of the power sink device. In this example, the policy manager (170) of the power sink device (150) sends instructions via control line (200) to the power consuming device (180). These instructions may include instructions to lower the power state of the power consuming circuit (180), stop the power consuming circuit (180), or otherwise instruct the power consuming circuit (180) to reduce power consumption. As indicated above, the power consuming circuit (180) may include a processor. In this example, the policy manager (170) instructs the processor to lower its frequency by asserting a slowdown signal such as a PROCHOT processor thermal monitor signal or other signal that functions to lower the operating speed of the processor or reduce power consumption of the processor (FIG. 5, 502). In another example, the power consuming circuit (180) may be a battery. In this example, the policy manager (170) instructs the battery to slow its charge rate (FIG. 5, 500). Whatever type of device the power consuming circuit (180) may be, the policy manager, (170), via the control line (200) is able to instruct the power consuming circuit (180) to drop to a lower power consuming state or otherwise reduce or stop consuming power.

Another way the power source device (100), the power sink device (150), or both take steps to decrease an amount of current across the PoDL cabling (140) is by increasing a voltage output of the power source device (100) to decrease a current on at least one power supply line including the $V_{bus}$ line (141), the ground line (143), or combinations thereof. In this example, the policy manager (120) of the source computing device (100) sends instructions to the power source (130) to increase the voltage output of the power source (130). In one example, the power source (130) is a direct current (DC) power source. Increasing the voltage output by the power source (130) causes the current across the $V_{bus}$ line (141) and the ground line (143) to decrease. This is especially true if the power consuming circuit (180) of the power sink device (150) is operating in a fixed power mode. The decreasing current across the $V_{bus}$ line (141) and the ground line (143) reduces or eliminates noise on the PoDL cabling (140). Further, the voltages differential at the first ground (115) and the second ground (125) begin to converge.

The above remedies correct data transfer errors between the power source device (100) and the power sink device (150) by reducing or eliminating noise on the PoDL cabling (140). Once the errors are corrected in this manner, the system including the power source device (100), the power sink device (150) and the PoDL cabling (140) may restore the constrained power consumption. In one example, the policy managers (120, 170) include a number of policies or rules that restore the voltages and currents within the system to a previous state. In one example, once a message is correctly received by, for example, the policy manager (170), the policy manager (170 may instruct the power consuming circuit (180) to return to a previous, non-low-power mode or state. In addition to or in place of restoring the power consuming circuit (180), the policy manager (120) of the power source device (100) may reduce the voltage output of the power source (130) to a pre-adjusted level. The decreasing of the current across the PoDL cabling (140) allows for data signals transferred via the PoDL cabling (140) to be correctly sent and received, and the restoration of the current across the PoDL cabling (140) to a pre-adjusted state or level provides for the power consuming circuit (180) to operate at capacity and at a desired performance level.

In one example, the system may cause the policy manager (170) of the power sink device (150) to instruct the power consuming circuit (180) to reduce power consumption, may cause the policy manager (120) of the source computing device (100) to instruct the power source (130) to increase its voltage output, or combinations thereof. In another example, one of these two actions is taken by the system, and precludes the other from executing. In this example, the system causes the policy manager (170) of the power sink device (150) to instruct the power consuming circuit (180) to reduce power consumption instead of causing the cause the policy manager (120) of the source computing device (100) to instruct the power source (130) to increase its voltage output. This may be the case since increasing a voltage output of a power source (130) may prove to be risky since doing so may cause a voltage spike in cases where the power consumed by power consumption circuit (180) is also decreased by the policy manager (170) of the power sink device (150).

Thus, in one example, if the system has already caused the policy manager (170) of the power sink device (150) to instruct the power consuming circuit (180) to reduce power consumption, then the system may preclude the policy manager (120) of the source computing device (100) to instruct the power source (130) to increase its voltage output. In this example, the policy manager (170) of the power sink device (150) sends a message to the policy manager (120) of the power source device (100) to inform the power source device (100) that the power consumption of the power consuming circuit (180) has been reduced, and that the policy manager (120) of the source computing device (100) should not instruct the power source (130) to increase its voltage output. Further, the power source device (100) may instruct the power source (130) to increase its voltage output if it is determined that the policy manager (170) of the power sink device (150) will not instruct the power consuming circuit (180) to reduce power consumption.

The above preclusive action may be decided by the power source device (100) and the power sink device (150) at the time the two devices are coupled via the PoDL cabling (140). When the PoDL cabling (140) is coupled to the devices (100, 150), an identification method may be executed wherein the characteristics and capabilities of the devices (100, 150) are shared between the two devices (100, 150), and priorities may be mutually set such that one of the devices (100, 150) would take their respective action to decrease current across the PoDL cabling (140), and that the other device (100, 150) would be precluded from doing the same.

In one example, one or both of the policy managers (120, 170) may preliminarily determine whether power consumption of the power consuming circuit (180) will likely effect communication over the CC line (142) of the PoDL cabling (140). The policy managers (120, 170) may make this determination before a retry of a failed message is taken, or before initiating a message. In this example, the power measurement device (194) detects the amount of current passing through the $V_{bus}$ line (141) and signals to the policy manager (120) of the power source device (100) that the amount of current has reached a threshold where sending a message to the power sink device (150) may result in an error in the communication. The policy manager (120), in response to this determination, may instruct the power source (130) to increase its voltage output in order to decrease the current passing over the $V_{bus}$ line (141). This preliminary action may serve to reduce or eliminate errors in the messages sent between the power source device (100) and the power sink device (150) before the messages are even sent.

In another example, the policy manager (170) may measure the power consumption of the power consuming circuit (180) via the control line (200), and quantify a likelihood that lowering the power consumption of the power consuming circuit (180) will effect message delivery. Methods of measuring power consumption may include directly measuring the power consumption of the power consuming circuit (180), detecting activity in the system including processor utilization, battery charge rate, display device brightness, total power consumption of external input/output devices, among other power consumption measurement techniques, or combinations thereof.

Figure 6:
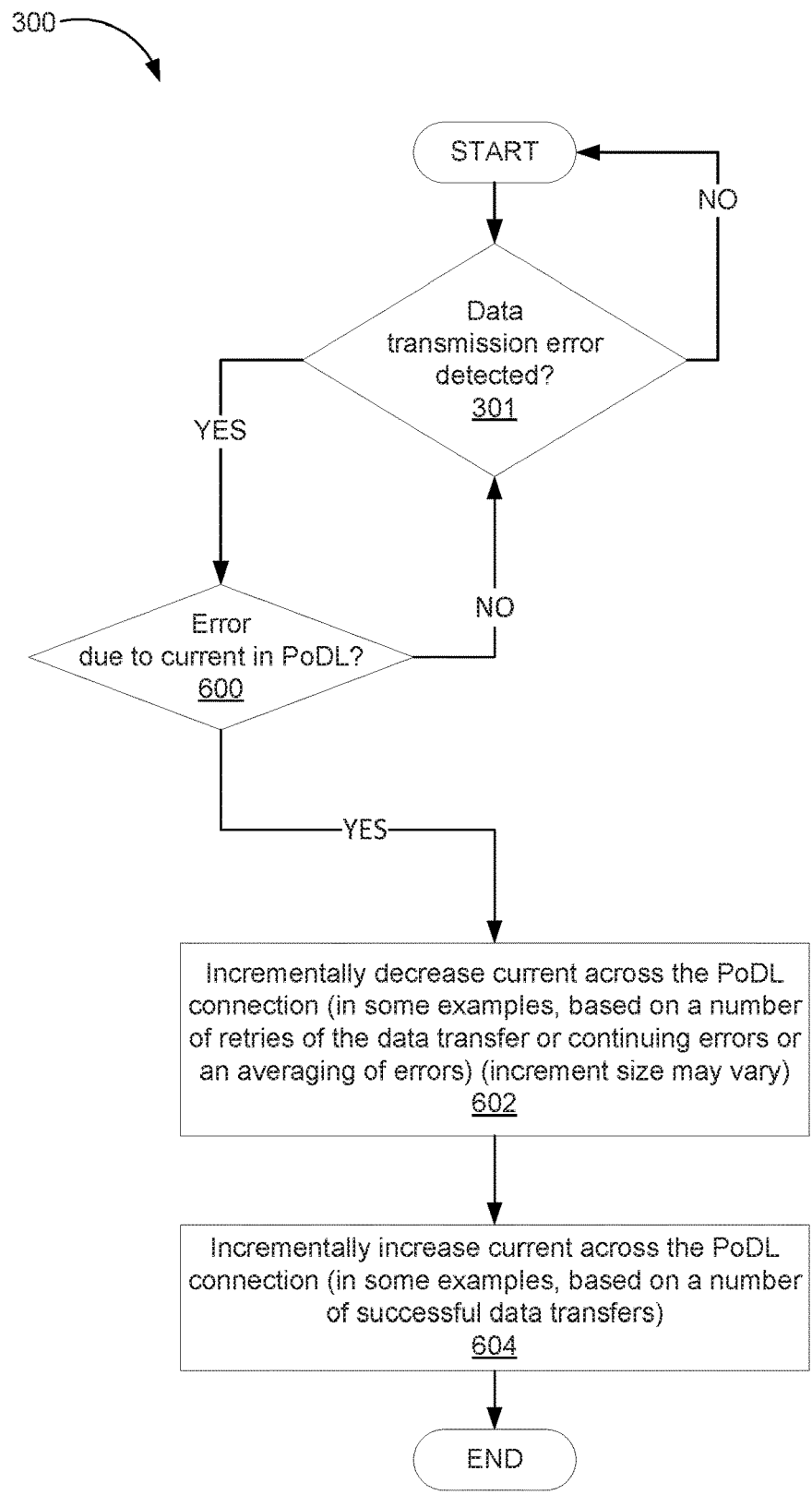

In still another example, once an error in message delivery has occurred, the policy managers (120, 170) may determine whether the error occurred because of the amount of current within the PoDL cabling (140) (FIG. 6, 600) or whether the error was created for some other reason in order to validate the corrective actions described above if such corrective actions are taken by the system. If the error occurred because of the amount of current within the PoDL cabling (140), then the policy managers (120, 170) may take the actions described above to reduce the amount of current within the PoDL cabling (140) (FIG. 6, 602). However, if the policy managers 120, 170) determine that the error was not due to the amount of current within the PoDL cabling (140), then the policy managers (120, 170) will not take the corrective actions described above. In this manner, the system is able to continue to operate at capacity and at a desired performance level when the error is not due to a communication error.

As described above, errors in communication may occur, and the corrective actions that decrease current across the PoDL cabling (140) may be taken to reduce or eliminate the errors in subsequent data transmissions. The system may then return the current across the PoDL cabling (140) to a previous state. However, even after the system is returned to its previous state, the errors in communication may persist. Thus, it may be disadvantageous to return the system back to the previous state if the errors are going to persist. In these instances, the system may average the errors over a period of time (FIG. 6, 602), and adjust the current across the PoDL cabling (140) in a number of increments between the original state and the initial altered state (FIG. 6, 602) in order to fine tune the system with respect to error reduction and operation at capacity and at a desired performance level. In one example, when returning the system back to an original state, the system may do so incrementally (FIG. 6, 604) where the increment of the constraint on power consumption by the power consuming circuit (180) or the increment in voltage output by the voltage source (130) may be progressive as a function of the number of message delivery retries executed or as a function of a measure of communication fault between the power source device (100) and the power sink device (150). In this example, the policy manager (170) may impose, for example, a 10% power reduction on the power consuming circuit (180) after a first message delivery retry. Thereafter, a progressive 20% reduction may be placed on the power consuming circuit (180) (FIG. 6, 602). Any number of incremental steps in power reduction on the power consuming circuit (180) may occur until the errors caused by current across the PoDL cabling (140) cease (FIG. 6, 602). In this example, the incremental steps include a 10% reduction in power consumption. However, any percentage may be used as an incremental step, and power reduction in successive incremental steps may or may not be approximately equal. For example, the first incremental step may be a 10% reduction, a second incremental step may be an additional 5% reduction, and a third incremental step may be a 2% reduction in power consumption (FIG. 6, 602).

After the system has reached a state in incremental power reduction on the power consuming circuit (180) where no errors occur, the system may then incrementally restore the system to a previous state. In one example, the same increments used to reduce power consumption may be used during the incremental restoration, or different increments may be used. Further, although this example has been described in connection with the reduction of power consumption by the power consuming circuit (180) and restoration of the power consumption, a similar incremental constraint and restoration may be placed on the voltage output by the power source (130), in place of or in addition to the reduction in power consumption by the power consuming circuit (180).

Figure 3:
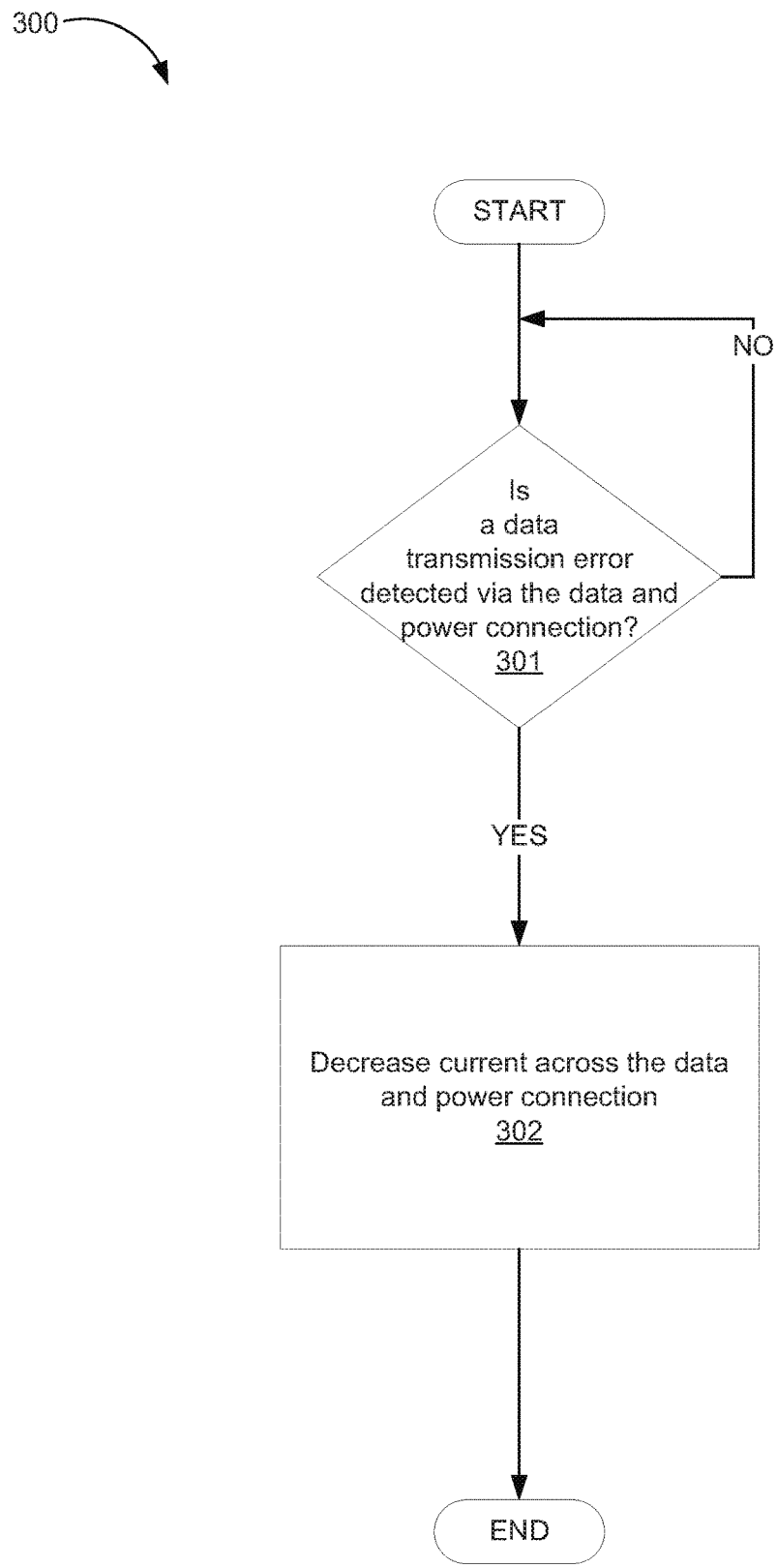
FIG. 3 is a flowchart showing a method of data transfer via a data and power connection, according to one example of the principles described herein.

Having described the various elements of the power source device (100) and the power sink device (150), and the manner in which they function to decrease current across the PoDL cabling (140) in order to reduce or eliminate data communication errors, these methods will now be described in more detail in connection with FIGS. 3 and 4. FIG. 3 is a flowchart showing a method (300) of data transfer via a data and power connection, according to one example of the principles described herein. The method (300) may begin by determining (block 301) whether a data transmission error is detected via the data and power connection (i.e. the PoDL cabling (140)). This determination (block 301) may be made by the policy managers (120, 170) or other processing devices within the power source device (100) and the power sink device (150). In response to a determination that a data transmission error is detected via the PoDL cabling (140) (block 301, determination YES), the policy managers (120, 170) take action to decrease current across the PoDL cabling (140). As described above, current may be decreased (block 302) across the PoDL cabling (140) by the policy manager (170) of the power sink device (150) instructing the power consuming circuit (180) to reduce power consumption, the policy manager (120) of the source computing device (100) instructing the power source (130) to increase its voltage output, or combinations thereof. In response to a determination that a data transmission error is not detected via the PoDL cabling (140) (block 301, determination NO), the method returns to block 301 and continually monitors the system for errors in data transmission between the power source device (100) and the power sink device (150). More detail regarding these methods will now be described in connection with FIG. 4.

Figure 4:
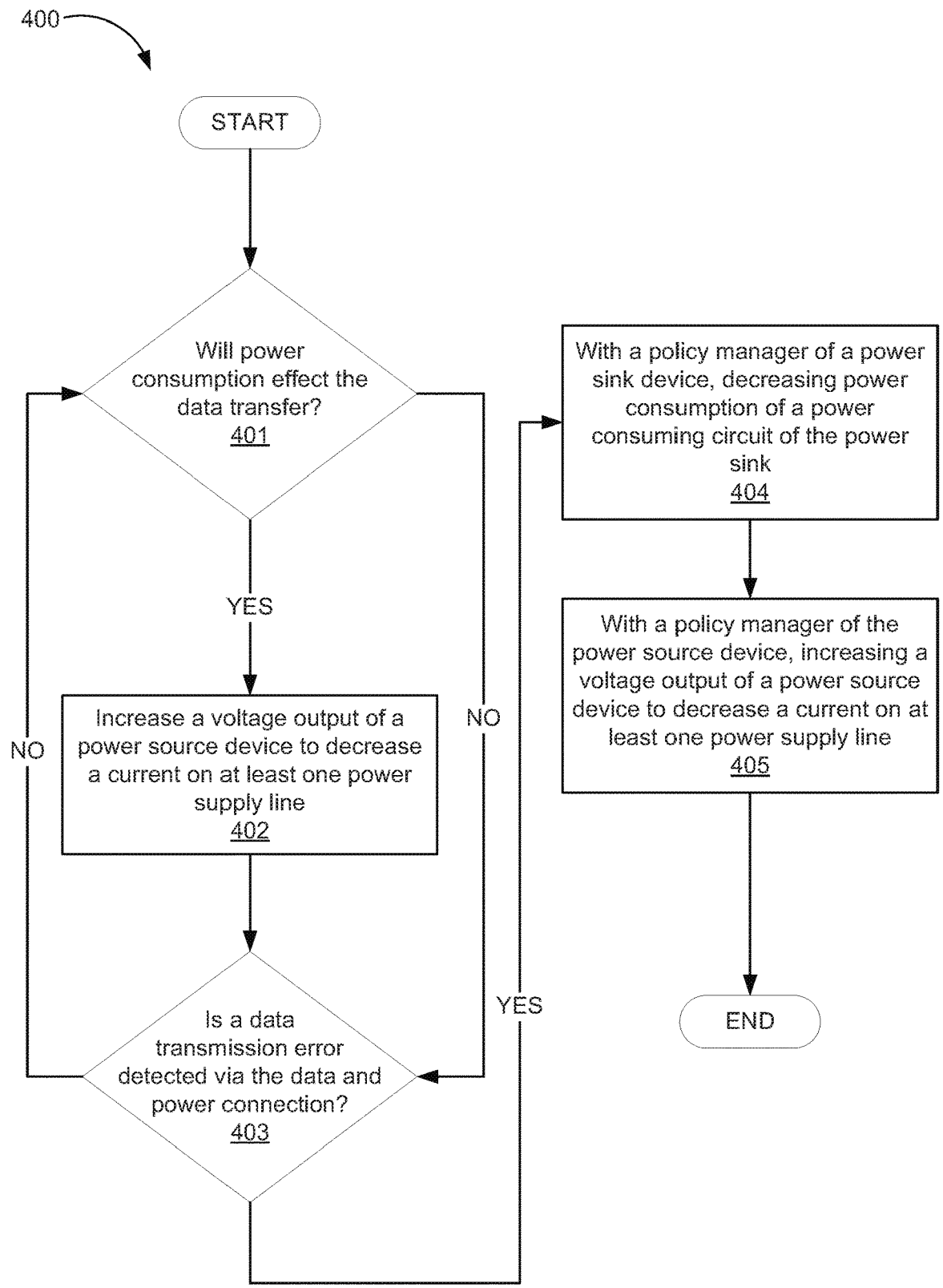
FIG. 4 is a flowchart showing a method of data transfer via a data and power connection, according to another example of the principles described herein.

FIG. 4 is a flowchart showing a method (400) of data transfer via a data and power connection, according to another example of the principles described herein. The method of FIG. 4 may begin by determining (block 401) whether power consumption by the power consuming circuit (180) of the power sink device (150) will affect the data transfer via the PoDL cabling (140) before initiating a data transfer or before initiating a retry of the data transfer. As described above, the policy managers (120, 170) may make this determination before a retry of a failed message is taken, or before initiating a message. In this example, the power measurement device (194) detects the amount of current passing through the $V_{bus}$ line (141) and signals to the policy manager (120) of the power source device (100) that the amount of current has reached a threshold where sending a message to the power sink device (150) may result in an error in the communication.

The method (400) of FIG. 4 may continue by, in response to a determination that power consumption by the power sink device will affect the data transfer (block 401, determination YES), increasing a voltage output of the power source (130) of the power source device (100) to decrease a current on the PoDL cabling (140). As described above, the policy manager (120), in response to this determination, may instruct the power source (130) to increase its voltage output in order to decrease the current passing over the $V_{bus}$ line (141). This preliminary action may serve to reduce or eliminate errors in the messages sent between the power source device (100) and the power sink device (150) before the messages are even sent.

If the system does not know if power consumption by the power sink device will affect the data transfer or if power consumption by the power sink device (150) will not affect the data transfer, (block 401, determination NO), the method may include determining (block 403) whether a data transmission error is detected via the data and power connection (i.e. the PoDL cabling (140)) as described above in connection with FIG. 3. If a data transmission error is detected via the PoDL cabling (140) (block 403, determination YES), then the system decreases current across the PoDL cabling (140).

Decreasing current across the PoDL cabling (140) includes, with the policy manager (170) of the power sink device (150), decreasing (block 404) power consumption of the power consuming circuit (180) of the power sink device (150). Further, decreasing current across the PoDL cabling (140) includes, with the policy manager (120) of the power source device (100), increasing (block 405) a voltage output of a power source device (100) including the power source (130) to decrease a current on at least one power supply line such as the $V_{bus}$ line (141), the ground line (143), or both. In response to a determination that a data transmission error is not detected via the PoDL cabling (140) (block 403, determination NO), the method returns to block 401 and continually monitors the system for power consumption effects and errors in data transmission between the power source device (100) and the power sink device (150).

In one example, decreasing power consumption of the power consuming circuit of the power sink device includes decreasing power consumption in a number of increments progressively based on a number of retries of the data transfer, a measure of severity of the data transmission error, or combinations thereof. Restoring power consumption of the power consuming circuit of the power sink device may also be implemented where the restoration in performed in a number of increments based on a number of successful data transfers.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the policy managers (120, 170) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a methods and systems of data transfer via a data and power connection. The method includes determining whether a data transmission error is detected via the data and power connection, and in response to a determination that a data transmission error is detected via the data and power connection, decreasing current across the data and power connection. In one example, decreasing current across the data and power connection includes, with a policy manager of a power sink device, decreasing power consumption of a power consuming circuit of the power sink device. In another example, decreasing current across the data and power connection includes, with a policy manager of the power source device, increasing a voltage output of a power source device to decrease a current on at least one power supply line. These methods and systems provide for robustness of communication between a power source device and a power sink device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of protecting data transfer on a cable that includes both a power line and a data line connection, the method comprising:
   determining whether a data transmission error is detected on the cable based on issuance of a not acknowledged (NACK) signal or failure to receive an acknowledged (ACK) message within a timeout limit;
   when a data transmission error is detected, determining whether the detected data transmission error was due to an amount of current in the cable interfering with data transmission on the data line of the cable based on noise over the data line; and
   in response to a determination that the detected data transmission error was due to the amount of current in the cable, decreasing current across the cable.

2. The method of claim 1, wherein decreasing current across the cable comprises, with a policy manager of a power sink device, decreasing power consumption of a power consuming circuit of the power sink device.

3. The method of claim 2, wherein the power consuming circuit is a battery, and wherein the policy manager decreases a charge rate of the battery.

4. The method of claim 2, wherein the power consuming circuit is a processing device, and wherein the policy manager decreases an operating speed of the processing device.

5. The method of claim 1, wherein decreasing current across the cable comprises decreasing the current across the cable so as to rectify a voltage differential between ground at a power source device at one end of the cable and a power sink device at an opposite end of the cable.

6. The method of claim 1, comprising:
   determining whether power consumption by a power sink device will affect data transfer via the cable before initiating a data transfer or before initiating a retry of the data transfer; and
   in response to a determination that power consumption by the power sink device will affect the data transfer, decreasing the amount of current on the cable.

7. The method of claim 1, wherein decreasing the current across the cable comprises decreasing the current over the cable in a number of increments progressively based on a number of retries of the data transfer.

8. The method of claim 7, comprising restoring the amount of current over the cable to an original level by increasing the current over the cable in a plurality of increments based on a number of successful data transfers.

9. The method of claim 7, wherein a size of successive increments in the number of increments decreases during decrease of the current across the cable.

10. The method of claim 7, further comprising averaging data transmission errors over time to determine an incremental change in the amount of current across the cable.

11. The method of claim 7, further comprising:
   continuing to decrease the current over the cable in increments until no data transmission errors are detected,
   then, incrementally increasing the current over the cable.

12. The method of claim 7, wherein a first increment of the number of increments is smaller than subsequent increments when data transfer errors persist after the first increment.

13. A system for transferring data via a combination data and power connection comprising:
   a device comprising a port for connection to a cable that includes both a data line and a power line;
   a policy manager of the device to:
      determine whether a data transmission error is detected on the cable based on issuance of a not acknowledged (NACK) signal or failure to receive an acknowledged (ACK) message within a timeout limit; and
      in response to a determination that a data transmission error is detected, decrease a current on the cable in a plurality of successive increments as a function of a number of message delivery retries executed.

14. The system of claim 13, the device further to determining whether the detected data transmission error was due to an amount of current in the cable interfering with data transmission on the data line of the cable based on noise over the data line prior to decreasing the current.

15. The system of claim 13, wherein the data transmission error is detected by error detection performed by a recipient device.

16. The system of claim 13, wherein the cable connection is a universal serial bus power delivery (USB-PD) connection.

17. The system of claim 13, wherein the device is a power source device that, in response to a determination that a data transmission error is detected, decreases a current being output by the power source device to the cable.

18. The system of claim 13, wherein the device is a power sink device that, in response to a determination that a data transmission error is detected, decreases power consumption of a power consuming circuit of the power sink device.

19. The system of claim 13, wherein the policy manager of the device:
   restores the current on the cable in a number of successive increments based on a number of successful data transfers.

20. A method of protecting data transfer on a cable that includes both a power line and a data line connection, the method comprising:
   determining whether a data transmission error is detected on the cable based on issuance of a not acknowledged (NACK) signal or failure to receive an acknowledged (ACK) message within a timeout limit; and
   in response to a determination that the detected data transmission error was due to the amount of current in the cable, decreasing current across the cable so as to rectify a voltage differential between ground at a power source device at one end of the cable and a power sink device at an opposite end of the cable.

* * * * *